(12) United States Patent
Andry et al.

(10) Patent No.: US 11,183,725 B2
(45) Date of Patent: Nov. 23, 2021

(54) LOW-PROFILE BATTERY CONSTRUCT WITH ENGINEERED INTERFACES

(71) Applicant: INTERNATIONAL BUSINESS MACHINES CORPORATION, Armonk, NY (US)

(72) Inventors: Paul S. Andry, Yorktown Heights, NY (US); Paul A. Lauro, Brewster, NY (US); Jae-Woong Nah, Closter, NY (US); Adinath Narasgond, Yonkers, NY (US); Robert J. Polastre, Cold Spring, NY (US); Bucknell C. Webb, Ossining, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 21 days.

(21) Appl. No.: 16/732,729

(22) Filed: Jan. 2, 2020

(65) Prior Publication Data

US 2020/0144564 A1    May 7, 2020

Related U.S. Application Data

(62) Division of application No. 15/061,169, filed on Mar. 4, 2016, now Pat. No. 10,581,037.

(51) Int. Cl.
| | |
|---|---|
| *H01M 50/183* | (2021.01) |
| *H01M 4/04* | (2006.01) |
| *H01M 4/66* | (2006.01) |
| *H01M 4/62* | (2006.01) |
| *H01M 4/50* | (2010.01) |
| *H01M 4/02* | (2006.01) |
| *H01M 50/411* | (2021.01) |

(52) U.S. Cl.
CPC ....... *H01M 50/183* (2021.01); *H01M 4/043* (2013.01); *H01M 4/0426* (2013.01); *H01M 4/0452* (2013.01); *H01M 4/0471* (2013.01); *H01M 4/50* (2013.01); *H01M 4/625* (2013.01); *H01M 4/66* (2013.01); *H01M 4/661* (2013.01); *H01M 4/664* (2013.01); *H01M 50/411* (2021.01); *H01M 2004/021* (2013.01); *H01M 2220/30* (2013.01)

(58) Field of Classification Search
None
See application file for complete search history.

(56) References Cited

U.S. PATENT DOCUMENTS

| 8,697,294 B1* | 4/2014 | Tsukamoto | ........... H01M 50/46 |
| | | | 429/332 |
| 2013/0089769 A1* | 4/2013 | Proctor | ................. H01G 11/46 |
| | | | 429/127 |
| 2017/0179455 A1* | 6/2017 | Andry | ................. H01M 50/411 |

OTHER PUBLICATIONS

List of IBM Patents or Patent Applications Treated as Related dated Jan. 2, 2020, 2 pages.

* cited by examiner

*Primary Examiner* — Anca Eoff
(74) *Attorney, Agent, or Firm* — Tutunjian & Bitetto, P.C.; Erik Johnson (57) ABSTRACT

A method for forming a battery structure includes texturing an anode packaging material to form a first textured surface, depositing one or more metal layers including an anode metal on the first textured surface and forming a separator on the anode metal. It also includes texturing a cathode packaging material to form a second textured surface, depositing a cathode metal on the second textured surface, and forming an electrolyte binder paste on the cathode metal, which contacts the separator with any gap being filled with electrolyte.

20 Claims, 5 Drawing Sheets

LOW-PROFILE BATTERY CONSTRUCT WITH ENGINEERED INTERFACES

BACKGROUND

Technical Field

The present invention relates to battery structures, and more particularly to batteries and methods for fabrication that include engineered interface surfaces to enable higher performance in battery structures.

Description of the Related Art

Low-profile batteries are employed in many applications. In particularly useful applications, low-profile batteries are employed in portable electronic devices, such as watches or smaller devices, and in many cases much smaller. Many layers in the battery structures are formed by conventional deposition processes. These battery structures include smooth interfaces between layers. The smooth interfaces may often lead to issues such as poor adhesion of seed metal to package materials, delamination of metal layers from seed metals, high stresses in metal layers and poor wetting or coating on metal layers by hydrogel or other materials (e.g., MnO2 pastes to cathodes) in the battery structure. The poor wetting or coating and smooth interfaces may also contribute to high electrical resistance between layers in the battery structure.

SUMMARY

A method for forming a battery structure includes texturing an anode packaging material to form a first textured surface, depositing one or more metal layers including an anode metal on the first textured surface and forming a separator on the anode metal. It also includes texturing a cathode packaging material to form a second textured surface, depositing a cathode metal on the second textured surface, and forming an electrolyte binder paste on the cathode metal, which contacts the separator with any gap being filled with electrolyte.

A method for forming a battery structure includes texturing an anode packaging material to form a first textured surface, depositing one or more metal layers including an anode metal on the first textured surface and forming a separator on the anode metal. It also includes texturing a cathode packaging material to form a second textured surface, depositing a $MnO_2$ paste on the cathode metal, and filling any gap between the hydrogel separator and the $MnO_2$ paste with electrolyte.

A method for forming a battery structure includes texturing an anode packaging material by picosecond laser scanning to form a first textured surface, depositing one or more metal layers including an anode metal on the first textured surface and forming a separator on the anode metal. It also includes texturing a cathode packaging material by picosecond laser scanning to form a second textured surface, depositing a cathode metal on the second textured surface, and forming an electrolyte binder paste on the cathode metal, which contacts the separator with any gap between the separator and the paste being filled with electrolyte.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

In accordance with the present principles, engineered interfaces are employed between layers of battery structures. The engineered interfaces may include a number of different technologies and structures. For example, for thin film polymer packaging materials (e.g., KAPTON®, polyethylene terephthalate (PET)), a micron level texture may be provided using rapid laser scanning. Laser scanning also has the effect of annealing stressed metal films, e.g., Zn metal films in the battery structure. Other embodiments for processing thin polymer films may include techniques such as hot embossing to create texture.

Thin inorganic materials may also be employed as packaging materials. Examples may include thin silicon, thin glass, ceramic, etc. These materials can be laser roughened by picosecond laser scanning, e.g., at wavelengths of 355 nm and/or 266 nm.

In other embodiments, thin silicon may be precision textured by a combination of photolithography and deep reactive ion etching (DRIE) etching. Surface roughening on the order of 0.5 microns peak to valley may be attained by blanket DRIE without lithography, while texturing with lithography permits patterns of tens of microns to be etched. Thin glass may be textured by a combination of photolithography and wet HF etching. Mechanical processes may also be employed for surface roughening by low cost techniques such as sand-blasting or milling.

The engineered interfaces in an active battery area of the battery structure provide, e.g., improved adhesion of seed metal to package materials, improved adhesion of metal layers (e.g., Zn) to seed metal, low stress metal layer(s) (e.g., laser annealed), good wetting and/or coating of metal layer by hydrogel and a good interlock of metal oxide paste to a cathode current collector (providing low electrical resistance). The engineered interfaces in a battery seal area of the battery structure provide, e.g., improved adhesion of seed metal to package material and improved adhesion of adhesive to seed metal and/or current collector metal.

It is to be understood that the present invention will be described in terms of a given illustrative architecture; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present embodiments may include a design for a battery structure for use with integrated circuits and/or chips. The design may be created in a graphical computer programming language, and stored in a computer storage medium (such as a disk, tape, physical hard drive, or virtual hard drive such as in a storage access network). If the designer does not fabricate batteries, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of battery structures. Photolithographic masks may be utilized to define areas of a wafer or substrate (and/or the layers thereon) to be etched or otherwise processed.

Methods as described herein may be used in the fabrication of battery structures, which may be employed with integrated circuits and/or chips. The chip may be mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. The integrated circuits or chips may be powered using the battery structure.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1:
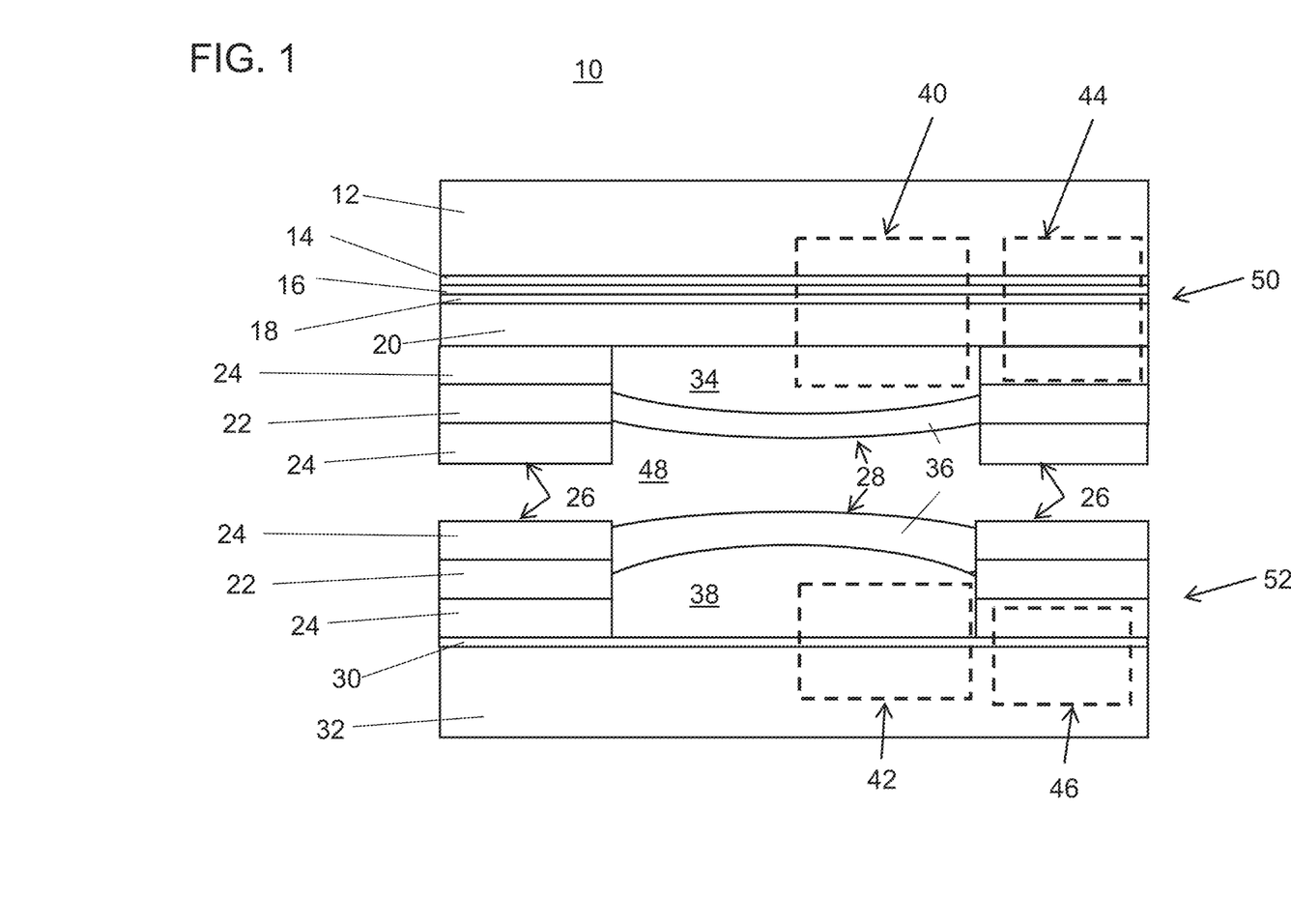
FIG. 1 is a cross-sectional view of a battery structure having engineered surfaces in accordance with the present principles.

Referring now to the drawings in which like numerals represent the same or similar elements and initially to FIG. 1, a two-sided battery structure 10 is shown in accordance with one illustrative embodiment. The battery structure 10 includes an anode 50 and a cathode 52. In one useful embodiment, the battery structure 10 is a low-profile structure (e.g., coin cells and smaller) being extremely thin and configured for use in portable devices. Portable devices may include watches, sensors, very small scale devices, devices that employ coin batteries, etc. While the structure will be described in terms of a particular architecture and materials, it should be understood that changes to the architecture and materials may be made in accordance with the present principles.

The battery structure 10 includes an anode package material 12. The anode package material 12 may include a thickness of between 1 to 5 thousandths of an inch (mils), and preferably about 2 mils. The anode package material 12 may include silicon, glass, ceramic, polymer (e.g., KAPTON®) or other substrate-like material. The anode package material 12 is textured in accordance with the present principles. Texturing may be performed on the anode package material 12 directly and/or after other layers have been added to the anode package material 12.

One or more metal layers (e.g., layers 14, 16, 18) may be deposited on the anode package material 12 to form the anode 50. The one or more layers may include a seed layer 14. The seed layer 14 may include Ti, although other metals may be employed. The seed layer 14 may include a thickness of about 1000 to 5000 Angstroms, and may be formed by a sputtering process or other suitable deposition process. The seed layer 14 may include an additional seed layer 16. The additional seed layer 16 is provided to bond to the seed layer 14 and provide a more uniform platform for plating a metal layer 20 for the anode 50. The additional seed layer 16 may include Ni, although other metals may be employed. The seed layer 16 may include a thickness of about 4500 to 5500 Angstroms and may be formed by a sputtering process or other suitable deposition process.

A transition layer 18 may include a plated metal layer, such as Ni (formed on the additional seed layer 16 (e.g., Ni)). The transition layer 18 may be formed by an electroless plating or electroplating process, although other suitable deposition processes may be employed. The transition layer 18 may include a thickness of about 0.8 to about 1.2 microns. An anode metal layer 20 is formed on the transition layer 18 and may include a plated metal layer, such as Zn. The anode metal layer 20 may be formed by an electroless plating or electroplating process, although other suitable deposition processes may be employed. The anode metal layer 20 may include a thickness of about 9.5 to about 10.5 microns. The anode metal layer 20 may be directly textured. In one embodiment, the anode metal layer 20 may be laser scanned to texture the surface and to anneal the anode metal layer 20 to relieve stress/strain in the anode metal layer 20.

The battery structure 10 includes an active battery region 28 disposed within a battery seal area or areas 26. The active battery region 28 provides ion transfer to provide charge flow for operation of the battery structure 10. The seal areas 26 seal materials in the active region 28.

On the anode side (50), the active region 28 includes a hydrogel separator 34. The hydrogel separator 34 includes a water permeable material (but physically impermeable) between the anode side (50) and the cathode side (52) of the battery structure 10. The separator 34 keeps the two electrodes apart to prevent electrical shorts while permitting the transport of ionic charge carriers and water, which are needed to close the circuit during the passage of current in the battery structure 10. The separator 34 may include a polymeric membrane 36 forming a microporous layer (e.g., fibers, fabric, etc.). The separator 34 and its polymeric membrane 36 permit electrolytes in solution 48 to transport charge carriers.

The separator 34 may include hydrogel that is confined using battery seal materials. The battery seal materials may include adhesive layers 18 and 24 that support a polymer core 22. The adhesive layers 18, 24 may include acrylic or epoxy materials. The polymer core 22 may include polyethylene terephthalate (PET).

The cathode 52 includes a cathode package material 32. The cathode package material 32 may include a thickness of between 1 to 5 thousandths of an inch (mils), and preferably about 2 mils. The cathode package material 32 may include silicon, glass, ceramic, polymer (e.g., KAPTON®) or other substrate-like material. The cathode package material 32 may be textured in accordance with the present principles. Texturing may be performed on the cathode package material 32 directly and/or after other layers have been added to the cathode package material 32.

One or more metal layers may be deposited on the cathode package material 32 to form the cathode 52. The one or more layers may include a metal layer 30. The metal layer 30 may include Ti, although other metals may be employed. The metal layer 30 may include a thickness of about 4500 to 5500 Angstroms and may be formed by a sputtering process or other suitable deposition process. The metal layer 30 follows the texture of the cathode package material 32. The metal layer 30 forms a cathode current collector. In one embodiment, the metal layer 30 may be laser scanned to texture the surface and to anneal the metal layer 30 to relieve stress/strain in the metal layer 30.

The battery structure 10 includes the active battery region 28 disposed within the battery seal area or areas 26. The active battery region 28 provides ion transfer to provide charge flow for operation of the battery structure 10. The seal areas 26 seal materials in the active region 28.

On the cathode side (52), the active region 28 includes a paste 38. The paste 38 includes an active material, such as, $MnO_2$ as well as a carbon-based conductor such as graphite or carbon black, although other materials may be employed. The paste 38 may be contained by a polymeric membrane 36 forming a microporous layer (e.g., fibers, fabric, etc.), and by battery seal materials. The battery seal materials may include adhesive layers 18 and 24 that support a polymer core 22. The adhesive layers 18, 24 may include acrylic or epoxy materials. The polymer core 22 may include PET.

The cathode side 52 and anode side 50 are disposed apart initially, and are then brought together with an electrolyte 36 being added to both sides, such that the wetted cathode paste 38, and the wetted separator 34 come into contact at midplane and minimize any gap. The gap can be filled with electrolyte solution 48, if needed.

FIGS. 2-5 show magnified views of regions 40, 42, 44 and 46 in FIG. 1. Regions 40, 42, 44 and 46 indicate texturing of the multiple layers of the battery structure 10.

Figure 2:
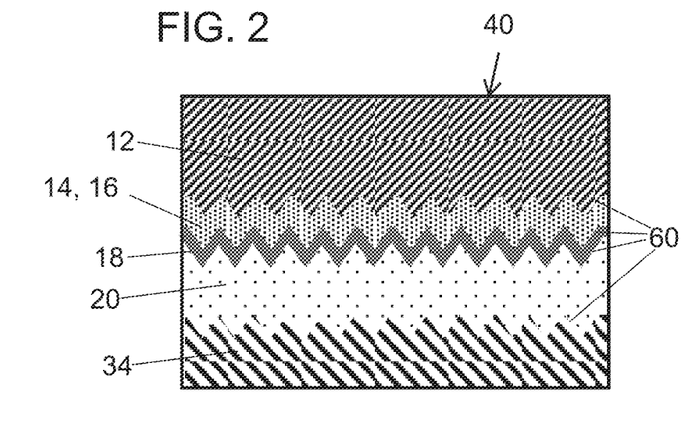
FIG. 2 is a cross-sectional view of a magnified region of an anode active area of the battery structure of FIG. 1 showing engineered surfaces in accordance with the present principles.

Referring to FIG. 2, region 40 is shown for an anode side of an active battery region. The anode package material 12, one or more layers 14, 16, transition layer 18 and anode metal layer 20 are shown with textured interfaces 60. The anode package material 12 may be textured using a laser scan, mechanical scraping, patterned etching, or other process to form ridges, fins, sinusoidal shapes, etc. The textured surfaces 60 may include two or three-dimensional shapes to increase surface area and/or roughness between adjoining materials.

In one embodiment, the textured surface on the anode package material 12 may be carried through the metal layers 14, 16 and/or 18 by conformally coating the metal layers 14, 16 and/or 18 on the textured surface of anode package material 12. Then, the metal layer 20 may be formed and textured by similar methods. In one embodiment, the metal layer 20 is textured using a laser scanning process. The laser scanning process may include heating the metal layer 20 to provide an anneal to relieve stress/strain of the metal layer 20. In other embodiments, any or all of the layers may be textured independently. The hydrogel of the separator 34 is shown engaging one of the textured surfaces of the metal layer 20.

The textured surfaces provide good adhesion of seed metal 14 to the package material 12, prevent metal delamination of the metal layer 20 and/or transition layer 18 from seed metal(s) 14, 16 and reduce stress in the metal layer 20. Poor wetting/coating of the metal layer 20 by hydrogel of the separator 34 is overcome by the texturing in accordance with the present embodiment.

Figure 3:
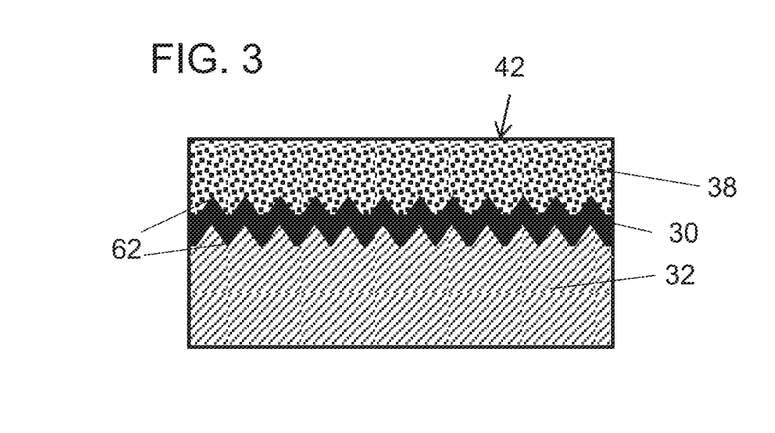
FIG. 3 is a cross-sectional view of a magnified region of a cathode active area of the battery structure of FIG. 1 showing engineered surfaces in accordance with the present principles.

Referring to FIG. 3, region 42 is shown for a cathode side of an active battery region. The cathode package material 32, one or more layers 30 and cathode paste 38 are shown with textured interfaces 62. The cathode package material 32 may be textured using a laser scan, mechanical scraping, patterned etching or other process to form ridges, fins, sinusoidal shapes, etc. The textured surfaces 62 may include two or three-dimensional shapes to increase surface area and/or roughness between adjoining materials.

In one embodiment, the textured surface on the cathode package material 32 may be carried through the metal layer(s) 30 by conformally coating the metal layer 30 on the textured surface of the cathode package material 32. Then, the metal layer 30 may be formed and textured by similar methods. In one embodiment, the metal layer 30 is textured using a laser scanning process. The laser scanning process may include heating the metal layer 30 to provide an anneal to relieve stress/strain in the metal layer 30. In other embodiments, any or all of the layers may be textured independently. The paste is shown engaging the textured surface of the metal layer 30.

The textured surfaces provide interlocking between the paste 38 and the metal layer 30 (e.g., cathode current collector). This improves/reduces electrical resistance.

Figure 4:
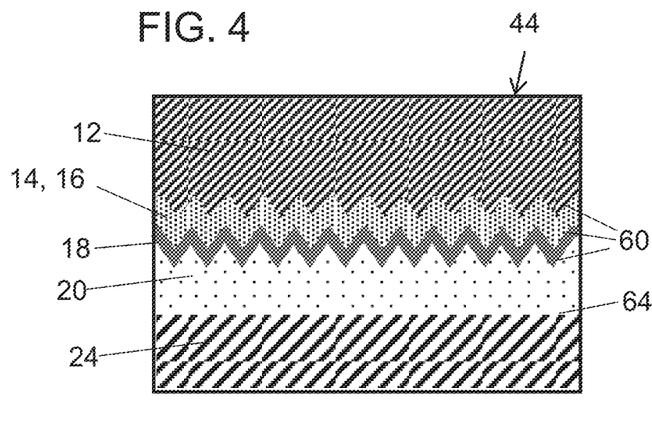
FIG. 4 is a cross-sectional view of a magnified region of an anode battery seal area of the battery structure of FIG. 1 showing engineered surfaces in accordance with the present principles.

Referring to FIG. 4, region 44 is shown for an anode side of a battery seal region. The anode package material 12, one or more layers 14, 16, transition layer 18 and anode metal layer 20 are shown with textured interfaces 60. The textured surfaces 60 may include two or three-dimensional shapes to increase surface area and/or roughness between adjoining materials.

In one embodiment, the textured surface on the anode package material 12 may be carried through the metal layers 14, 16 and/or 18 by conformally coating the metal layers 14, 16 and/or 18 on the textured surface of anode package material 12. Then, the metal layer 20 may be formed and textured by similar methods. In one embodiment, the metal layer 20 is textured using a laser scanning process. In other embodiments, any or all of the layers may be textured independently. The textured surfaces provide good adhesion of seed metal 14 to the package material 12 and prevent metal delamination of the metal layer 20 and/or transition layer 18 from seed metal(s) 14, 16. The metal layer 20 may interface with the seal materials 24 using a textured surface or a smooth interface 64. The textured surface is made with the hydrogel of the separator 34 to overcome issues as described herein.

Figure 5:
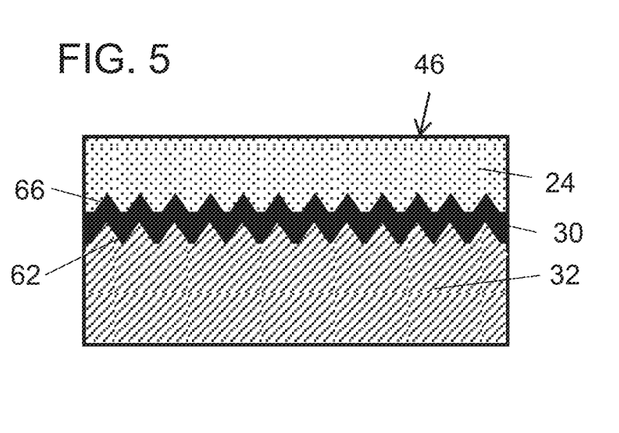
FIG. 5 is a cross-sectional view of a magnified region of a cathode battery seal area of the battery structure of FIG. 1 showing engineered surfaces in accordance with the present principles.

Referring to FIG. 5, region 46 is shown for a cathode side of a battery seal region. The cathode package material 32, one or more layers 30 and seal materials 24 are shown with textured interfaces 62. The cathode package material 32 may be textured using a laser scan, mechanical scraping, patterned etching, or other process to form ridges, fins, sinusoidal shapes, etc. The textured surfaces 62 may include two or three-dimensional shapes to increase surface area and/or roughness between adjoining materials.

In one embodiment, the textured surface on the cathode package material 32 may be carried through the metal layer(s) 30 by conformally coating the metal layer 30 on the textured surface of the cathode package material 32. In one embodiment, the metal layer 30 is textured using a laser scanning process. The laser scanning process may include heating the metal layer 30 to provide an anneal to relieve stress/strain of the metal layer 30. In other embodiments, any or all of the layers may be textured independently. The metal layer 30 may interface to the seal materials 24 using a textured interface 66.

Figure 6:
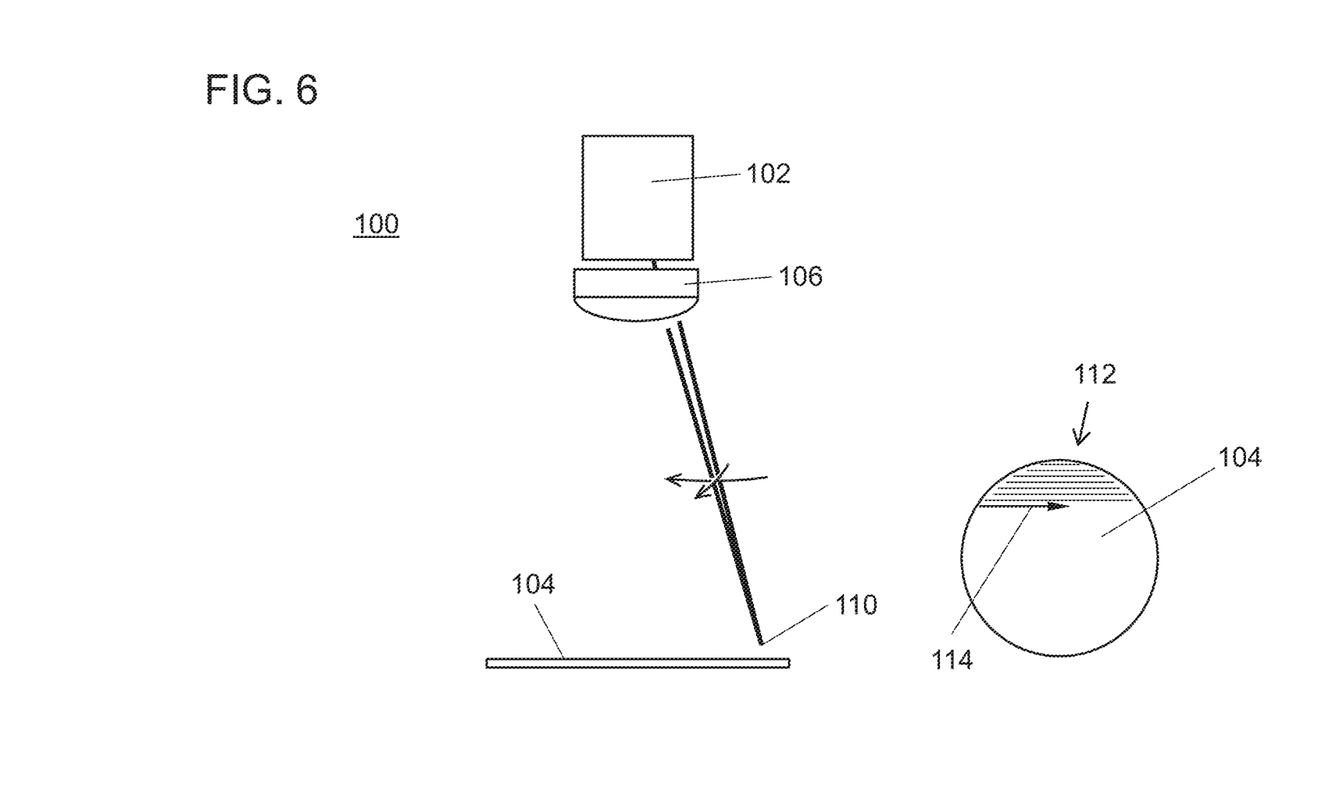
FIG. 6 is a schematic view of a laser scanning device for forming engineered surfaces in accordance with one embodiment.

Referring to FIG. 6, a laser scanning setup 100 is illustratively shown for surface engineering interfaces in accordance with one illustrative embodiment. A laser scanner 102 is arranged over a workpiece 104. The workpiece 104 includes a portion of the battery structure 10 that is to be textured to provide improvements in accordance with the present principles. The scanner 102 includes the ability to move a laser spot 110 in the x and y directions relative to the workpiece 104, a platform with the workpiece 104 on it moves relative to the spot 110. In one embodiment, the scanner 102 operates with an F-theta scan lens 106. Example parameters for the scanner 102 include 1 meter/sec serpentine scan with a 15 micron (full width at half maximum (FWHM)) spot size and a 15 micron line/line pitch. The laser may include 1 to 2 Watts power with a 50 kHz repetition rate. These parameters are illustrative as other parameters may be employed in accordance with the present principles.

A top view 112 of the workpiece 104 illustratively shows a scan path 114 that creates micron level roughness in polymers such as KAPTON®, PET, plated metal Zn, etc. in accordance with the present principles.

Figure 7:
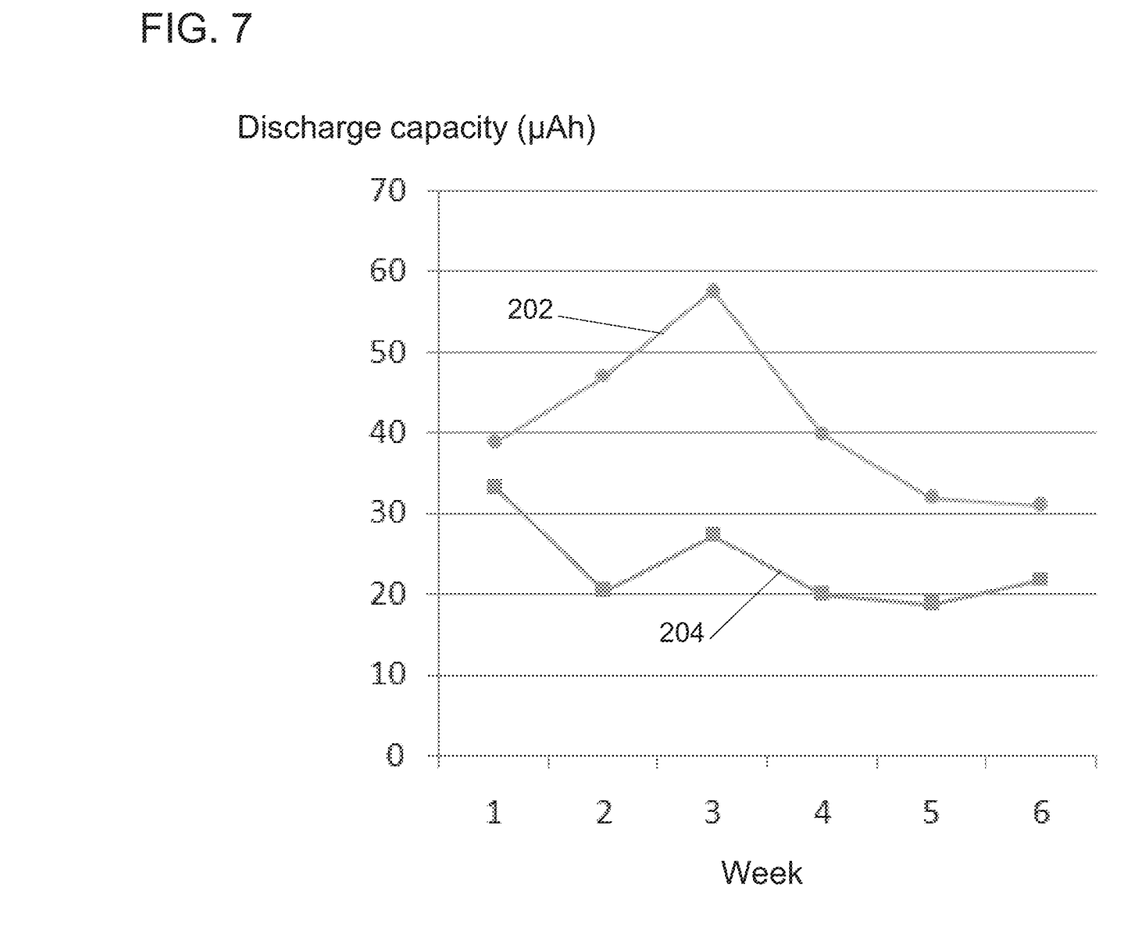
FIG. 7 is a graph of discharge capacity of batteries (in $\mu Ah$) versus weeks showing improved performance for batteries with engineered surfaces in accordance with the present principles.

Referring to FIG. 7, a graph of discharge capacity (μAh) versus number of weeks of storage is shown to compare battery structures with laser engineered interfaces in accordance with the present principles, against battery structures with smooth interfaces (conventional). A plot 202 shows battery structures with laser engineered interfaces. A plot 204 shows battery structures with smooth interfaces (conventional).

Two batches of 48 batteries each were created using KAPTON® packaging and PET/acrylic tape seals. One batch made use of laser engineering on interfaces as shown in FIGS. 2-5 while the other batch has smooth interfaces. Every week, four of each batch were discharged and plotted in plot 202 and 204, respectively. Average discharge capacity was decided higher for the laser engineered samples in plot 202 over plot 204.

Figure 8:
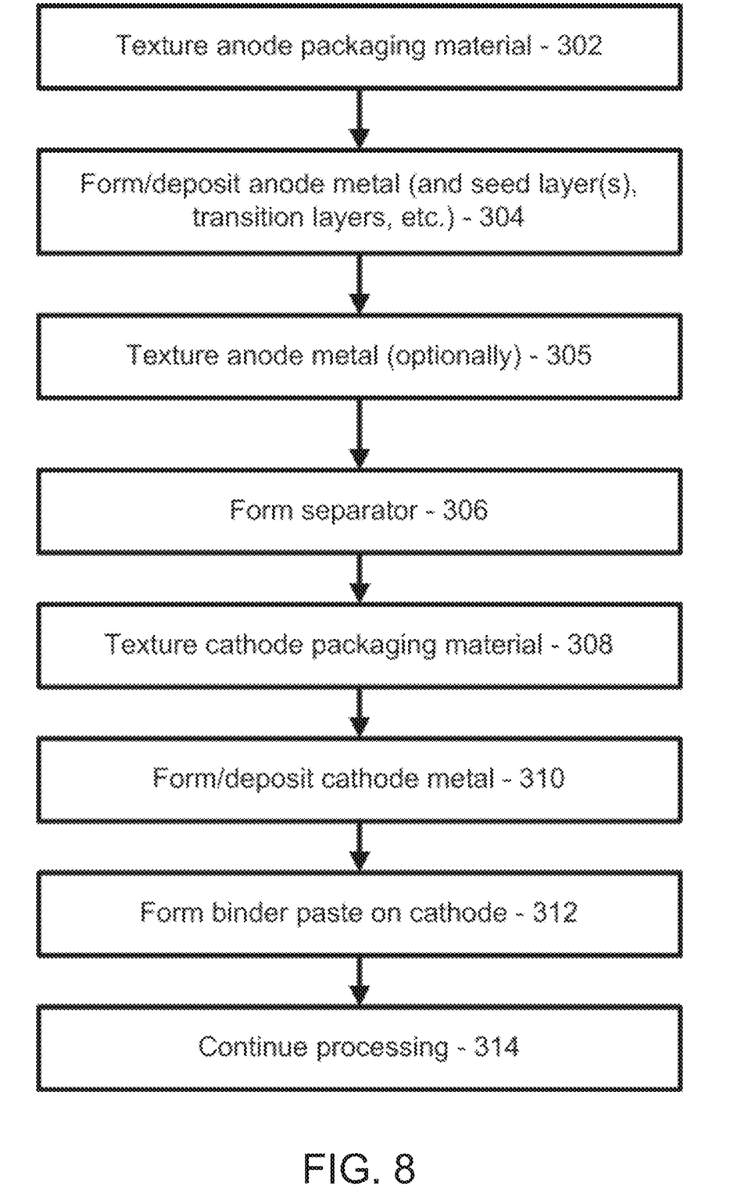
FIG. 8 is a block/flow diagram showing methods for fabricating a battery structure having engineered surfaces in accordance with the present principles.

Referring to FIG. 8, a method for forming a battery structure is illustratively shown in accordance with exemplary embodiments. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In block 302, an anode packaging material is textured to form a first textured surface. Texturing the anode packaging material may include laser writing, lithographical patterning, mechanically embossing textural elements, etc. Thin organic or inorganic materials may also be employed as packaging materials. The texturing may include laser roughened surfaces by, e.g., picosecond laser scanning at wavelengths of, e.g., 355 nm and/or 266 nm. In other embodiments, texturing may be performed by photolithography and etching, e.g., (DRIE) etching or wet etching (HF etch). Surface roughening on the order of 0.5 microns peak to valley may be attained by blanket DRIE without lithography, while texturing with lithography permits patterns of tens of microns to be etched. Thin glass may be textured by a combination of photolithography and wet HF etching. Mechanical processes may also be employed for texturing/surface roughening by sand-blasting, embossing, milling, etc.

In block 304, one or more metal layers are deposited to form an anode. The deposition may include one or more seed layers formed on the anode packaging material wherein the anode metal is formed on the seed layer. The seed layers or layers provide a surface for applying or plating an anode metal. A transition layer may be formed on the seed layer wherein the anode metal is formed on the transition layer. The seed layers may be sputtered while the transition layer and the anode metal may be plated to reduce cost. The seed layers and transitional layers may be conformally deposited or formed to maintain the textured surface of the anode packaging material. The anode metal is formed on the first textured surface of the anode packaging material to increase contact surfaces and improve battery performance.

In block 305, the anode metal may be textured independently. In one embodiment, a laser scanning to form a roughened or textured surface may be employed that also anneals the anode metal to reduce stress/strain.

In block 306, a separator is formed on the anode metal. The separator may include hydrogel and a porous membrane for electrolyte transfer. The separator is sealed outside an active battery area using adhesives and/or a core polymer. The battery seal area need not be textured but may also benefit from having textured surfaces.

In block 308, a cathode packaging material is textured to form a second textured surface. Texturing the cathode packaging material may include laser writing, lithographical patterning, mechanically embossing textural elements, etc. Thin organic or inorganic materials may also be employed as packaging materials. The texturing may include laser roughened surfaces by, e.g., picosecond laser scanning at wavelengths of, e.g., 355 nm and/or 266 nm. In other embodiments, texturing may be performed by photolithography and etching, e.g., (DRIE) etching or wet etching (HF etch). Surface roughening on the order of 0.5 microns peak to valley may be attained by blanket DRIE without lithography, while texturing with lithography permits patterns of tens of microns to be etched. Thin glass and other materials may be textured by a combination of photolithography and wet HF etching. Mechanical processes may also be employed for texturing/surface roughening by sand-blasting, embossing, milling, etc.

In block 310, a cathode current collector metal is deposited on the second textured surface. The cathode current collector metal layer(s) may be conformally deposited or formed to maintain the textured surface of the cathode packaging material. In block 312, a paste, e.g., a blend of $MnO_2$ and graphite) may be formed on the cathode current collector metal. The paste may be sealed outside the active battery area using adhesives and/or a core polymer. The battery seal area need not be textured but may also benefit from having textured surfaces. A gap formed between the separator and the paste is to be minimized. Any gap may be filled with an electrolytic material (solution). The separator saturated with electrolyte and should push right up against the cathode paste. This gives best performance. If a gap does exist, it is filled with electrolyte.

The textured surface formed in accordance with the present principles may include two or three dimensional shapes such as hills and valleys, pyramids, sinusoidal shapes, grooves, wavy trenches, roughed surfaces, etc. In particularly useful embodiments, the shapes may include laser-written grooves. It should be noted that the battery structure may include one textured surface (e.g., a layer in the anode only) or any number of textured surfaces (layers in the anode and cathode). The textures surface may be formed over a portion of the surface or may be intermittently formed on a surface or surfaces.

In block 314, processing continues to complete the battery structure, which may include enclosing the battery or installing the battery within another assembly. The battery structure may be employed as a low-profile battery to be employed in an electronic device, such as a watch, stand-alone sensor, a biomedical device, etc.

Having described preferred embodiments for a low-profile battery construct with engineered interfaces (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for forming a battery structure, comprising:
    texturing an anode packaging material to form a first textured surface;
    depositing one or more metal layers including an anode metal on the first textured surface;
    forming a separator on the anode metal;
    texturing a cathode packaging material to form a second textured surface;
    depositing a cathode metal on the second textured surface; and
    forming an electrolyte binder paste on the cathode metal, which contacts the separator with any gap being filled with electrolyte.

2. The method as recited in claim 1, wherein texturing the anode packaging material includes one of laser writing, lithographical patterning or mechanically embossing textural elements.

3. The method as recited in claim 1, wherein texturing the anode packaging material includes surface roughening on the order of 0.5 microns peak to valley.

4. The method as recited in claim 1, wherein texturing the cathode packaging material includes one of laser writing, lithographical patterning, or mechanically embossing textural elements.

5. The method as recited in claim 1, wherein texturing the cathode packaging material includes surface roughening on the order of 0.5 microns peak to valley.

6. The method of claim 1, wherein depositing one or more metal layers on the first textured surface includes forming one or more seed layers and forming the anode metal on the one or more seed layers.

7. The method of claim 6, wherein depositing one or more metal layers on the first textured surface includes forming a transition layer on the one or more seed layers.

8. The method of claim 1, wherein the one or more metal layers is conformally deposited on the first textured surface such that the one or more metal layers maintain the textured surface of the anode packaging material.

9. The method of claim 1, further comprising texturing the anode metal using laser scanning to form a textured surface and annealing the anode metal.

10. The method of claim 1, further including sealing the separator and the paste outside an active battery area.

11. The method of claim 1, wherein the cathode metal is conformally deposited on the second textured surface such that the cathode metal maintains the textured surface of the cathode packaging material.

12. A method for forming a battery structure, comprising:
    texturing an anode packaging material to form a first textured surface;
    depositing one or more metal layers including an anode metal on the first textured surface;
    depositing a hydrogel separator on a textured anode metal;
    texturing a cathode packaging material to form a second textured surface;
    depositing a cathode metal on the second textured surface;
    depositing a $MnO_2$ paste on the cathode metal; and
    filling any gap between the hydrogel separator and the $MnO_2$ paste with electrolyte.

13. The method as recited in claim 12, wherein texturing the anode packaging material includes one of laser writing, lithographical patterning or mechanically embossing textural elements.

14. The method as recited in claim 12, wherein texturing the cathode packaging material includes one of laser writing, lithographical patterning, or mechanically embossing textural elements.

15. The method of claim 12, wherein depositing one or more metal layers on the first textured surface includes forming one or more seed layers and forming the anode metal on the one or more seed layers.

16. The method of claim 12, wherein the one or more metal layers is conformally deposited on the first textured surface such that the one or more metal layers maintain the textured surface of the anode packaging material.

17. The method of claim 12, further comprising texturing the anode metal using laser scanning to form the textured surface and annealing the anode metal.

18. The method of claim 12, further including sealing the separator and the paste outside an active battery area.

19. The method of claim 12, wherein the cathode metal is conformally deposited on the second textured surface such that the cathode metal maintains the textured surface of the cathode packaging material.

20. A method for forming a battery structure, comprising:
   texturing an anode packaging material by picosecond laser scanning to form a first textured surface;
   depositing one or more metal layers including an anode metal on the first textured surface;
   forming a separator on the anode metal;
   texturing a cathode packaging material by picosecond laser scanning to form a second textured surface;
   depositing a cathode metal on the second textured surface; and
   forming an electrolyte binder paste on the cathode metal, which contacts the separator with any gap between the separator and the paste being filled with electrolyte.

* * * * *